United States Patent Office 3,057,871
Patented Oct. 9, 1962

3,057,871
NEW DYESTUFFS
Eduard Moser, Basel, Switzerland, assignor to Ciba Limited, Basel, Switzerland, a company of Switzerland
No Drawing. Filed Nov. 21, 1960, Ser. No. 70,375
Claims priority, application Switzerland Nov. 23, 1959
6 Claims. (Cl. 260—295)

This invention provides dyestuffs of the general formula (1)

in which $R_1$, $R_2$, $R_3$ and $R_4$ each represent a hydrogen atom or a substituent not imparting solubility in water and any two of which substituents in ortho-position relatively to one another may together with the vicinal carbon atoms of the basic structure form a ring $m$, $n$, $p$ and $q$ each represent the whole number 1 or 2, and B represents a benzene radical free from groups imparting solubility in water.

The invention also provides a process for the manufacture of the dyestuffs of the above general Formula 1, wherein two molecular proportions of a halide of a 2:3-phthaloyl-pyrrocoline-1-carboxylic acid of the formula (2)

(the numbering of the pyrrocoline ring is that given in Patterson's ring index) in which $R_1$, $R_2$, $R_3$, $R_4$, $m$, $n$, $p$ and $q$ have the meanings given above, are condensed with one molecular proportion of a diaminobenzene free from acid groups imparting solubility in water.

In the phthaloyl-pyrrocoline carboxylic acids of the Formula 2 $R_3$ and $R_4$ each advantageously represent a hydrogen atom or a simple substituent, such as a halogen atom or a lower alkyl group, $R_3$ and $R_4$ may, together with the vicinal carbon atoms of the pyridine ring, form an alicyclic, heterocyclic or aromatic ring. $R_1$ and $R_2$ advantageously represent hydrogen atoms, but may represent halogen atoms, for example, chlorine or bromine atoms.

The 2:3-phthaloyl-pyrrocoline carboxylic acids of the Formula 2 can be obtained, for example, by the process described in United States Patent No. 2,877,230 patented March 10, 1959, to Robert S. Long et al. by condensing a 2:3-dichloronaphthoquinone with an aceto-acetic acid alkyl ester and pyridine or a substitution product thereof, for example, α-picoline, and hydrolyzing the alkyl ester so obtained to the free carboxylic acid. As a suitable naphthoquinone there may be mentioned more especially, owing to the ease with which it can be obtained, 2:3-dichloronaphthoquinone itself. Alternatively, there may be used 2:3:5- or 2:3:6-trichloronaphthoquinone, 2:3-dibromonaphthoquinone or 2:3:6:7-tetrabromonaphthaquinone.

There are advantageously used the chlorides of the 2:3-phthaloyl-pyrrocoline carboxylic acids. These chlorides can be obtained from the carboxylic acids in known manner by treating the latter with an acid-chlorinating agent for example, phosphorus trichloride, phosphorus pentachloride or phosphorus oxychloride, but more especially thionyl chloride.

The treatment with such acid-halogenating agents is advantageously carried out in an inert organic solvent such as dimethyl-formamide, a chlorobenzene, for example monochloro- or dichlorobenzene, toluene, xylene or nitrobenzene. When the last mentioned solvent is used the reaction can be accelerated by a small proportion of dimethyl-formamide.

In making the carboxylic acid halides it is of advantage first to dry the carboxylic acid which has been produced in an aqueous medium or to free it from water by subjecting it to azeotropic boiling in an organic solvent. This azeotropic drying may be carried out immediately before the treatment with the acid-halogenating agent.

As diamino-benzenes there may be used, for example, meta-diaminobenzenes, or more especially para-diaminobenzenes of the formula (3)

in which X and Y each represent a halogen atom, a hydrogen atom or a lower alkyl or alkoxy group or a nitro group. As examples there may be mentioned:

1:4-diaminobenzene,
1:4-diamino-2-chlorobenzene,
1:4-diamino-2:5-dichlorobenzene,
1:4-diamino-2:5-dibromobenzene,
1:4-diamino-2:5-dimethoxybenzene,
1:4-diamino-2:5-diethoxybenzene,
1:4-diamino-2-chloro-5-methylbenzene,
1:4-diamino-2:6-dichlorobenzene,
1:4-diamino-2-methylbenzene,
1:4-diamino-2:3:5:6-tetrachlorobenzene,
1:4-diamino-2-chloro-5-methoxybenzene,
1:4-diamino-2:6-dimethylbenzene,
1:4-diamino-2:3:5:6-tetramethylbenzene.

The condensation of the phthaloyl-pyrrocoline carboxylic acid halides with the diamines is advantageously carried out in an anhydrous medium. Under these conditions the condensation generally takes place surprisingly easily at temperatures within the boiling range of ordinary organic solvents, such as toluene, monochlorobenzene, dichlorobenzene, trichlorobenzene, nitrobenzene and the like. In order to accelerate the reaction an acid-binding agent, such as anhydrous sodium acetate, pyridine or anhydrous ammonia, may be used. The dyestuffs are generally obtained in very good yield and in a pure state. It may be of advantage in order to obtain especially pure dyestuffs to separate the acid chloride obtained from the carboxylic acid and, if desired, to recrystallize it. In most cases, especially when thionyl chloride is used as acid-chlorinating agent, it is possible without harm, and even in some cases with better results, to dispense with separation of the acid chloride and to carry out the condensation in the reaction mixture in which the acid chloride has been formed.

The dyestuffs of this invention can be used for dyeing a very wide variety of materials, for example, as vat dyestuffs for dyeing cellulose fibers or animal fibers, such as wool or silk, or synthetic fibers, such as polyamide, or polyester fibers. The dyestuffs may also be sulfonated and used in that condition for dyeing the aforesaid fibers. Furthermore, the dyestuffs are suitable for all purposes for which pigments are used, for example, for so-called pigment printing, that is to say, the method of printing in which a pigment is fixed on a substratum, especially on a textile fiber, or on another sheet-like structure, such as paper, for example, wallpaper, or a fabric of glass fibers by means of an adhesive, such as casein, a hardenable synthetic resin, especially a urea-formaldehyde or melamine-formaldehyde condensation product, or a solution or emulsion of polyvinyl chloride or polyvinyl acetate or other emulsion, for example, an oil-in-water or water-in-oil emulsion. The pigments can also be used for other purposes, for example, in the finely divided form for dyeing fibers of viscose or cellulose ethers or esters or fibers of polyamides or polyurethanes or polyacrylonitrile in the spinning composition. They are also suitable for coloring lacquers or lacquer formers, solutions or products or acetyl-cellulose, nitro-cellulose, natural substances of high molecular weight, such as gums, casein or synthetic resins, such as polymerization resins, for example polyvinyl chloride, polyethylene, polypropylene or polystyrene, or condensation resins, for example, aminoplasts, phenoplasts, or silicones or silicone resins. They can also be used with advantage in the manufacture of colored pencils, cosmetic preparations or laminated sheets.

Owing to their chemical inertness and good resistance to heat the pigments of this invention can be dispersed in the usual manner in compositions or products of the kind mentioned above, and this is advantageously carried out at a stage in which such compositions or products have not been brought into the final form. The pigments can be converted into a finely subdivided form by the known conditioning methods. Operations required for shaping, such as spinning, pressing, hardening, casting, sticking or the like can then be carried out in the presence of the pigments.

The pigments are distinguished by their excellent fastness to light and migration.

The following examples illustrate the invention, the parts and percentages being by weight unless otherwise stated, and the relationship of parts by weight to parts by volume being the same as that of the kilogram to the liter:

*Example 1*

30.9 parts of 2:3-phthaloylpyrrocoline-carboxylic acid chloride of the formula

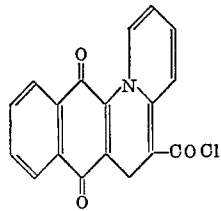

prepared as described in U.S. Patent 2,877,230 patented March 10, 1959, to Robert S. Long et al. by heating 2:3-dichloro- or 2:3-dibromonaphthoquinone, aceto-acetic acid ester and pyridine, hydrolyzing the resulting 2:3-phthaloylpyrrocoline-1-carboxylic acid ethyl ester to form the carboxylic acid and reacting the latter with thionyl chloride—are suspended at 115° C. in 750 parts of anhydrous ortho-dichlorobenzene; after about 20 minutes a clear solution is obtained into which in the course of about 5 minutes is poured a solution heated at 120° C. of 7.2 parts of 2-chloro-1:4-diaminobenzene in 150 parts of anhydrous ortho-dichloro-benzene and 2.5 parts of anhydrous pyridine. The whole is heated to 140 to 145° C. and maintained at that temperature for 4 hours, after which it is allowed to cool to 100° C., filtered, and the resulting pigment is washed with ortho-dichlorobenzene heated at 100° C. until the solvent runs off substantially colorless. The product is then washed with a small amount of cold methanol and then with hot water. The red pigment is dried in vacuo at 90 to 100° C. When used for coloring polyvinyl chloride foils it produces a bluish red coloration of excellent fastness to migration and light. The pigment dissolves in concentrated sulfuric acid with blue coloration and dyes cellulose fibers from the vat bluish red tints of good fastness to light and wetting.

When 2-chloro-1:4-diaminobenzene is replaced by an equivalent amount of 2:5-dichloro-1:4-diaminobenzene, and the resulting pigment is used for coloring polyvinyl chloride foils, a pure red tint is obtained, while 2:5-dibromo-1:4-diamino-benzene produces a scarlet tint, 1:3-dibromo-4:6-diaminobenzene a claret tint, 2-chloro-5-methyl-1:4-diaminobenzene a claret tint, 2:5-dimethoxy-1:4-diaminobenzene a brown tint, 2:5-diethoxy-1:4-diaminobenzene a yellowish brown tint, and 1:4-diamino-2-nitrobenzene a reddish brown tint.

All aforementioned colorations are of excellent fastness to migration and light.

*Example 2*

A suspension of 29.1 parts of 1:2-phthaloylpyrrocoline-3-carboxylic acid of the formula

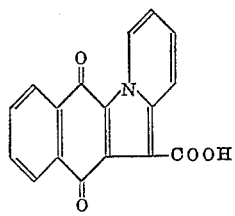

in 750 parts of anhydrous ortho-dichlorobenzene and 14.8 parts of thionyl chloride is heated within about 40 minutes to 130° C. and maintained for 2 hours at 130 to 135° C. The resulting solution of the acid chloride is treated within 5 minutes with a solution heated at 120° C. of 7.2 parts of 2-chloro-1:4-diaminobenzene in 150 parts of anhydrous ortho-dichlorobenzene and 2.5 parts of anhydrous pyridine. The reaction mixture is heated to 140° C. and maintained at that temperature for about 10 hours, then allowed to cool to 100° C., and the precipitated pigment is filtered off and washed with ortho-dichlorobenzene heated at 100° C. until the washing liquor runs substantially colorless. The filter residue is then washed with a small amount of methanol and then with hot water. The pigment is dried in vacuo at 90 to 100° C. The properties of the pigment so obtained correspond to those of the pigment prepared as described in Example 1.

*Example 3*

34.4 parts of 4'- or 5'-chloro-1:2-phthaloylpyrrocoline-3-carboxylic acid chloride of the formula

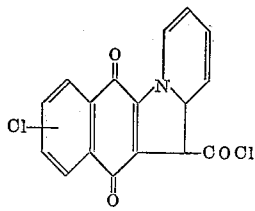

melting at 206 to 212° C., uncorrected, with decomposition—prepared from 2:3:6-trichloro-1:4-naphthoquinone with acetoacetic acid ethyl ester and pyridine, followed by hydrolysis to yield the free carboxylic acid and forming its acid chloride with thionyl chloride—are condensed with 8.85 parts of 2:5-dichloro-1:4-diaminobenzene as described in Example 1. The resulting pigment colors polyvinyl chloride foils claret shades having good fastness to migration and light, and cellulose fibers from the vat claret shades having good fastness to light and wetting.

When 2:5-dichloro-1:4-diaminobenzene is replaced by an equivalent amount of 1:4-diaminobenzene, there are obtained in polyvinyl chloride foils a blue shade and on cotton from the vat a bluish violet shade. Coloring with 2-chloro-1:4-diaminobenzene produces a violet shade, with 2:5-diethoxy-1:4-diaminobenzene an olive shade, with 2-chloro-5-methyl-1:4-diaminobenzene a violet shade, with 2:5-dimethyl-1:4-diaminobenzene a reddish blue shade, and with 2:5-dibromo-1:4-diaminobenzene a bluish red shade.

All colorations in polyvinyl chloride possess good fastness to migration and light and the vat dyeings possess good fastness to light and wetting.

*Example 4*

When the acid chloride is prepared from 32.6 parts of 4'- or 5'-chloro-2:3-phthaloylpyrrocoline-1-carboxylic acid of the formula

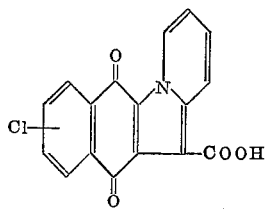

as described in Example 2 and condensed as stated with 8.85 parts of 2:5-dichloro-1:4-diaminobenzene, the resulting pigment possesses properties identical with those of the pigment described in Example 3.

*Example 5*

65 parts of polyvinyl chloride, 35 parts of dioctylphthalate and 0.2 part of the pigment prepared as described in Example 1, paragraph 1, are stirred together and rolled to-and-fro on a two-roller calender for 7 minutes at 145° C. The resulting red foil displays good fastness to light and migration. When in addition to the dyestuff pigment mentioned above there are used 5 parts of titanium dioxide, a red pastel shade is obtained.

*Example 6*

0.25 part of the dyestuff as claimed in Example 1 are ground for 24 hours in a rod mill with 40 parts of an alkyd-melamine stoving lacquer containing 50% of solids, and with 4.75 parts of titanium dioxide. A thin coating of the resulting lacquer is brushed on an aluminum foil and stoved for one hour at 120° C. A red lacquer coating of good fastness light is obtained.

*Example 7*

For the manufacture of a laminate the following component layers are prepared:

(a) Strong paper of unbleached sulfate cellulose (so-called kraft paper) is impregnated with an aqueous phenol-formaldehyde resin solution, pressed and dried.

(b) Paper of pure, chemically bleached cellulose containing zinc sulfide or titanium dioxide as filler is impregnated with an aqueous solution of dimethylolmelamine of 50% strength, pressed and dried at 100° C.

(c) 400 parts of a fancy paper of bleached cellulose containing zinc sulfide or titanium dioxide as filler are disintegrated in a hollander with 10,000 parts of water, 30 parts of the pigment prepared as described in Example 1 are added to the paper pulp so obtained. The pigment is fixed by adding 16 parts of aluminum sulfate. The dyed fancy paper is impregnated with an aqueous solution of dimethylolmelamine of 50% strength, pressed and dried at 100° C.

(d) According to the quality of the laminate the fancy paper is protected with tissue paper of bleached special cellulose, weighing 40 grams per square meter. The tissue paper is likewise impregnated with an aqueous solution of dimethylolmelamine of 50% strength, pressed and dried at 100° C.

A sandwich is prepared from the papers thus treated, each measuring, for example, 2.75 m. by 1.25 m., in the following order: First 3 to 5 sheets of paper (a), one sheet of paper (b), one sheet of paper (c) and if desired one sheet of paper (d), and the sandwich is compressed between mirror-chromed plates for 12 minutes at 140 to 150° C. under a pressure of 100 kg. per sq. cm. The sandwich is then cooled to 30° C. and removed from the press, whereupon it displays on one side a bluish red shade having very good fastness to light.

*Example 8*

1 part of the dyestuff obtained as described in Example 1 from 2:5-dichloro-1:4-diaminobenzene is vatted in 100 parts of water containing 4 parts by volume of sodium hydroxide solution of 30% strength with 2 parts of sodium hydrosulfite at 45° C. The resulting stock vat is added to a solution of 4 parts by volume of sodium hydroxide solution of 30% strength and 2 parts of sodium hydrosulfite in 2000 parts of water. In the resulting dyebath 100 parts of cotton are dyed for one hour at 25 to 30° C. with addition of 20 parts of sodium chloride. The cotton is then squeezed, oxidized in air, rinsed, acidified, again rinsed and soaped at the boil. A bluish red dyeing is obtained which has excellent fastness to light and wetting.

What is claimed is:

1. A dyestuff of the formula

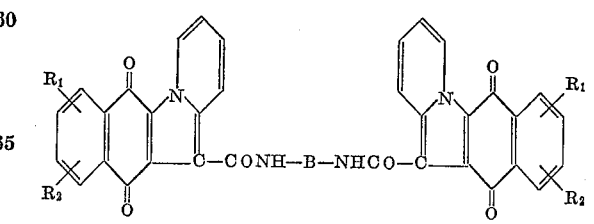

in which $R_1$ and $R_2$ each represents a member selected from the group consisting of a hydrogen atom and a halogen atom, and B is a member selected from the group consisting of phenylene, halophenylene, lower alkylphenylene, lower alkoxylphenylene and nitrophenylene, the NH-links being removed from each other by at least 3 nuclear carbon atoms.

2. The dyestuff of the formula
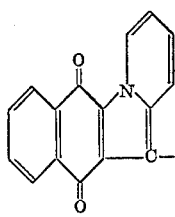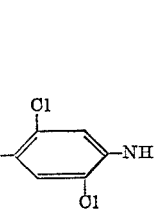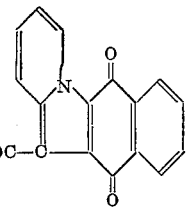
4. The dyestuff of the formula
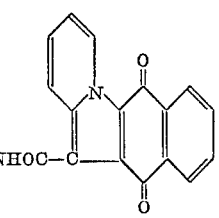
5. The dyestuff of the formula
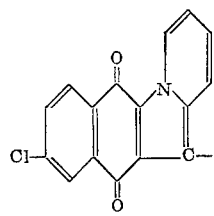
6. The dyestuff of the formula
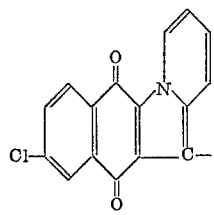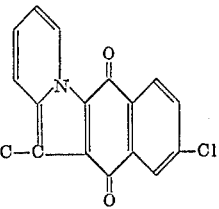
3. The dyestuff of the formula
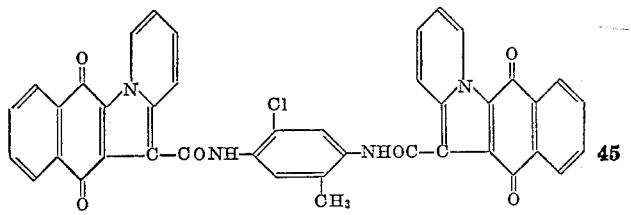
References Cited in the file of this patent
UNITED STATES PATENTS
2,772,274 Schmidt-Nickels et al. ____ Nov. 27, 1956
2,773,873 Randall et al. _____ Dec. 11, 1956
2,877,230 Long et al. _____ Mar. 10, 1959
OTHER REFERENCES
Noller: Chemistry of Organic Compounds (1957), p. 549 (Saunders).